(12) United States Patent
Zoppas et al.

(10) Patent No.: US 7,700,029 B2
(45) Date of Patent: Apr. 20, 2010

(54) DEVICE AND METHOD FOR CONDITIONING PLASTIC OBJECTS

(75) Inventors: Matteo Zoppas, Fontanafredda (IT); Massimo Coran, Spresiano (IT)

(73) Assignee: S.I.P.A. Societa Industrializzazione Progettazione E automazione S.p.A., Vittorio Veneto (IT)

( * ) Notice: Subject to any disclaimer, the term of this patent is extended or adjusted under 35 U.S.C. 154(b) by 474 days.

(21) Appl. No.: 10/591,731

(22) PCT Filed: Mar. 1, 2005

(86) PCT No.: PCT/EP2005/050892

§ 371 (c)(1),
(2), (4) Date: Sep. 1, 2006

(87) PCT Pub. No.: WO2005/084914

PCT Pub. Date: Sep. 15, 2005

(65) Prior Publication Data

US 2008/0093770 A1    Apr. 24, 2008

(30) Foreign Application Priority Data

Mar. 2, 2004    (IT)    .......................... RM04A000107

(51) Int. Cl.
*B29C 45/42*    (2006.01)
(52) U.S. Cl. ................. 264/297.3; 264/297.8; 264/334; 425/444; 425/547; 425/576
(58) Field of Classification Search ........... 425/444, 425/436 RM, 576, 547, 556; 264/297.3, 264/297.8, 334
See application file for complete search history.

(56) References Cited

U.S. PATENT DOCUMENTS

| | | | |
|---|---|---|---|
| 1,439,284 | A | 12/1922 | Ayres |
| 2,757,267 | A | 7/1956 | Brauer et al. |
| 3,302,556 | A | 2/1967 | Durbin |
| 3,604,880 | A | 9/1971 | O'Neill |
| 3,624,672 | A | 11/1971 | Spivy |

(Continued)

FOREIGN PATENT DOCUMENTS

DE    19608135 A1    3/1996

(Continued)

OTHER PUBLICATIONS

Derwent abstract 2000-358554 which describes JP2000117825A dated Apr. 2000.

(Continued)

*Primary Examiner*—Yogendra Gupta
*Assistant Examiner*—Emmanuel S Luk
(74) *Attorney, Agent, or Firm*—Knobbe Martens Olson & Bear LLP (57) ABSTRACT

The device for conditioning preforms in plastic material comprises a rotating turret (20), having a group of conditioning cavities (22) for inserting preforms, partly through an opening on a first side (A) of the turret and partly through an opening on a second side (B) of the turret. The conditioning cavities (22) which open on the first side (A) are disposed in such a way that for part of their length (L1) they are situated side by side with the cavities which open on the second side (B). In this way the turret becomes more compact. There is also described a conditioning method for the preforms.

11 Claims, 7 Drawing Sheets

U.S. PATENT DOCUMENTS

| | | | |
|---|---|---|---|
| 4,268,240 A | 5/1981 | Rees et al. | |
| 4,268,241 A | 5/1981 | Rees et al. | |
| 4,315,725 A | 2/1982 | Yoshino et al. | |
| 4,449,913 A | 5/1984 | Krishnakumar et al. | |
| 4,560,430 A | 12/1985 | Watanabe et al. | |
| 4,726,754 A | 2/1988 | Breuker et al. | |
| 4,801,260 A | 1/1989 | Oles et al. | |
| 4,832,593 A | 5/1989 | Brown | |
| 4,836,767 A * | 6/1989 | Schad et al. | 425/552 |
| 4,968,242 A | 11/1990 | Anderson | |
| 4,996,779 A | 3/1991 | Nakagomi et al. | |
| 5,114,327 A * | 5/1992 | Williamson et al. | 425/139 |
| 5,180,893 A | 1/1993 | Sugiyama et al. | |
| 5,244,610 A | 9/1993 | Kitzmiller | |
| 5,513,445 A | 5/1996 | Farrag et al. | |
| 5,569,476 A * | 10/1996 | van Manen et al. | 425/556 |
| 5,593,711 A | 1/1997 | Glaesener | |
| 5,658,619 A | 8/1997 | Kirschner et al. | |
| 5,674,439 A | 10/1997 | Hume et al. | |
| 5,776,402 A | 7/1998 | Glaesener | |
| 5,855,932 A * | 1/1999 | Bright et al. | 425/444 |
| 6,027,329 A | 2/2000 | Nazarian et al. | |
| 6,123,538 A | 9/2000 | Kutalowski | |
| 6,143,225 A * | 11/2000 | Domodossola et al. | 264/237 |
| 6,171,097 B1 | 1/2001 | Urbanek | |
| 6,171,541 B1 * | 1/2001 | Neter et al. | 264/328.14 |
| 6,299,431 B1 * | 10/2001 | Neter | 425/526 |
| 6,386,857 B1 | 5/2002 | Nava | |
| 6,391,244 B1 * | 5/2002 | Chen | 264/336 |
| 6,402,497 B1 | 6/2002 | Banjyo et al. | |
| 6,634,877 B2 * | 10/2003 | Sicilia et al. | 425/112 |
| 6,817,855 B2 * | 11/2004 | Unterlander et al. | 425/150 |
| 6,844,533 B1 | 1/2005 | Chuang | |
| 6,869,276 B2 | 3/2005 | Babin et al. | |
| 6,986,653 B2 * | 1/2006 | Unterlander et al. | 425/150 |
| 7,048,535 B2 | 5/2006 | Takanohashi | |
| 7,080,978 B2 | 7/2006 | Glaesener | |
| 2002/0136794 A1 | 9/2002 | Cargile et al. | |
| 2004/0164070 A1 | 8/2004 | Terano | |
| 2004/0173949 A1 | 9/2004 | Storione et al. | |

FOREIGN PATENT DOCUMENTS

| | | |
|---|---|---|
| DE | 102004022036 | 7/2005 |
| EP | 0 849 067 A | 6/1998 |
| EP | 0 909 711 A | 4/1999 |
| EP | 0914924 A | 5/1999 |
| EP | 1 367 348 A | 12/2003 |
| FR | 1430899 | 3/1966 |
| FR | 2 576 283 A | 7/1986 |
| FR | 2 837 738 A | 10/2003 |
| FR | 2 839 041 A | 10/2003 |
| GB | 402561 | 12/1933 |
| GB | 936 147 A | 9/1963 |
| JP | 2000117825 A | 4/2000 |
| WO | WO 8901400 A | 2/1989 |
| WO | WO 9962692 | 12/1999 |
| WO | WO 0056510 A | 9/2000 |
| WO | WO 01/49075 A | 7/2001 |
| WO | WO 03/035360 A1 | 5/2003 |
| WO | WO 03/072265 A | 9/2003 |
| WO | WO 03/086734 A | 10/2003 |
| WO | WO 2004/024346 A2 | 3/2004 |

OTHER PUBLICATIONS

English abstract of Japanese patent application No. 10045431 in the name of Seiki Corp., published Sep. 17, 1999 as No. 11 240046.

Partial machine translation of JP2000117825A dated Apr. 2000 obtained from the JPO website.

Patent Abstract of Japan, Publication 2002067113; Publication Date: Mar. 5, 2002 for the Applicant Mitsubishi Heavy Ind. Ltd.

Patent Abstract of Japan Publication No. 06155510; Publication Date: Jun. 3, 2004 for the Applicant Toshiba Corp.

* cited by examiner

Fig. 1

PRIOR ART

DEVICE AND METHOD FOR CONDITIONING PLASTIC OBJECTS

FIELD OF THE INVENTION

The present invention concerns a device for moulding objects of plastic material, designed to carry out a part of their conditioning outside the mould itself, with the aim of increasing the production rate of the press or moulding station; such objects in plastic material can be in particular "preforms", intended to be subsequently transformed into plastic containers, especially bottles or jars through a blowing process.

STATE OF THE ART

For the production of containers, especially those for liquid foods or fluids, the practice has been for some time to make use of plastic materials and in particular PET (polyethylene terephthalate). Such containers, although being of various types (for example bottles, jars, flagons) will here be referred to generically as bottles which in effect represent the containers most in use.

There exist two principal types of production processes for plastic bottles, the so called "single stage process" and "two stage process" in the course of both of which there is produced an intermediate product, the so called parison or preform. The preforms are obtained through various processes, for example by injection, by extrusion linked to further heat moulding operations etc.

In the two stage process the preforms obtained for example by injection moulding, usually with moulds equipped with a large number of mould cavities, are cooled and kept in an intermediate stocking location maintained at room temperature. The blowing operation is carried out subsequently subject to heating to make the preforms sufficiently plastic.

Generally the longest phase of the majority of injection moulding processes is the cooling phase of the moulded object inside the mould itself, until it is sufficiently rigid to be extracted from the mould and handled. Therefore, to increase the production rate of the moulding station there have been developed various devices to carry out part of the cooling of the preforms outside the injection mould. Examples of some such devices are described in Patent EP 1252007 and in the Italian Patent Application RM2003A000459.

Figure 1:
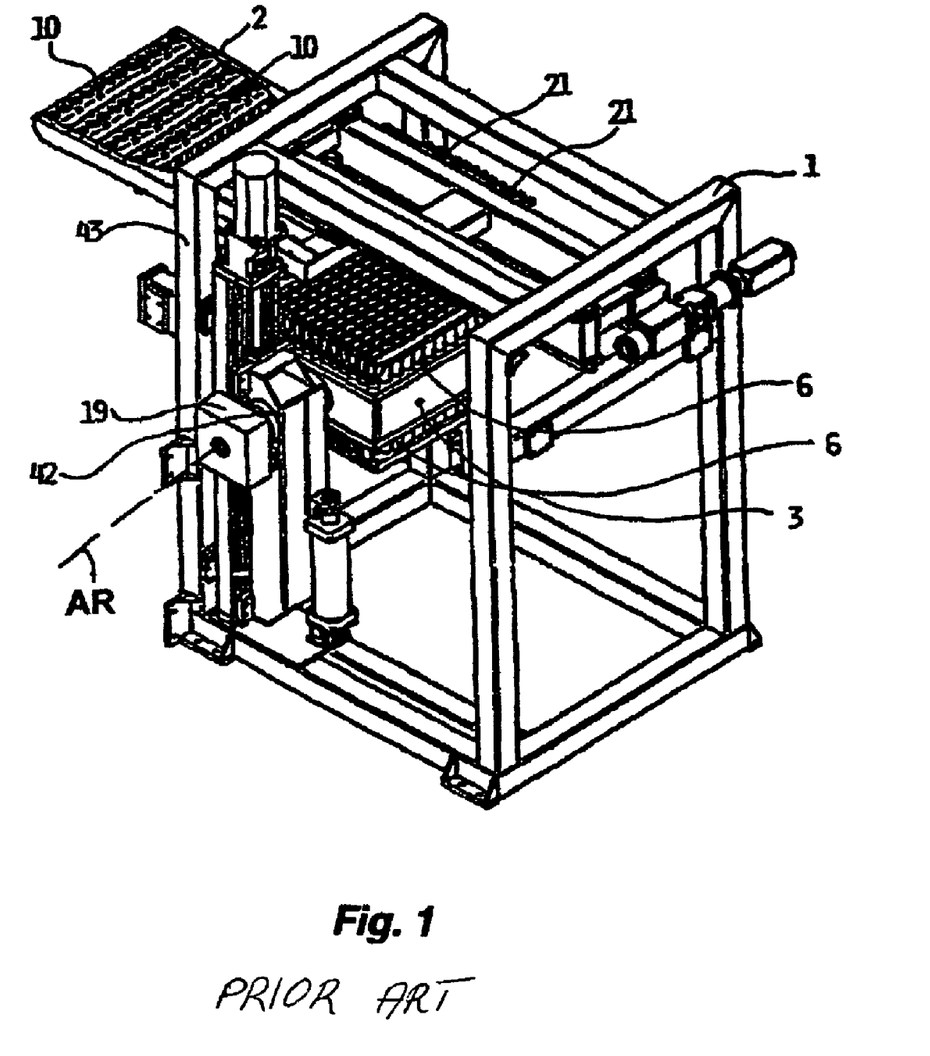
FIG. 1 shows in outline a perspective view of an extraction and cooling station of a known type.

Such a device of the State of the Art, illustrated in FIG. 1 and indicated globally by reference numeral 1, is provided with a first sliding plate 2 which, horizontally translating, inserts itself between the two open halves of the injection mould. A group N of preforms P, where N indicates the number of moulding cavities in the mould, drops into the slots 10 of the sliding plate 2. The translating sliding plate is extracted from the mould and positioned on the vertical of a second rotating plate 3 on the two sides of which is located a group of N cooling cup-like cavities, or simply cups of the type described for example in the Patent Application WO02/074518. The N preforms P drop into the cooling cavities on either of the two sides of the second rotating plate 3 where they can continue cooling outside the injection mould until they reach the desired temperature.

An important object of the present invention is to provide a device for the moulding of plastic objects and a relative method of moulding in order to increase the time cycle of the moulding station by carrying out part of the cooling of the moulded objects outside the extraction mould, representing a significant improvement over known devices and methods and particularly over those described in Patent application EP1252007.

Another object of the present invention is to provide an alternative device with a simpler and more economical construction and which retains a modularity feature which enables it to be employed in already existing moulding plants.

A still further object of the invention is to improve the quality of the preform produced, making more straightforward and rational their handling during a phase of their production when they are more greatly subject to damage, being still hot and of reduced surface durability.

SUMMARY OF THE INVENTION

The above objects are achieved, according to one aspect of the present invention through a rotating device for the conditioning of plastic objects having characteristics according to claim 1, and, according to a second aspect of the present invention, through a moulding device for plastic objects having characteristics according to claim 8.

From a third aspect of the present invention the above mentioned objects are achieved by a conditioning method for objects of plastic material having characteristics according to claim 10.

Due to the characteristics of the invention device, an important advantage which stems from the new device is to reduce the costs of production as it has simpler kinematics. Furthermore, due to simplification and reduction in the number of elements which make up the device, the preforms undergo fewer manipulations and thus the risk is reduced of blows, scratches, etc. which can occur by contact with grasping elements and with other bodies at a lower temperature.

Other advantages stemming from the present invention will be more apparent to an expert in the art from the following detailed description of an example of a particular non limiting embodiment, with reference to the following figures.

DETAILED DESCRIPTION

Figure 2:
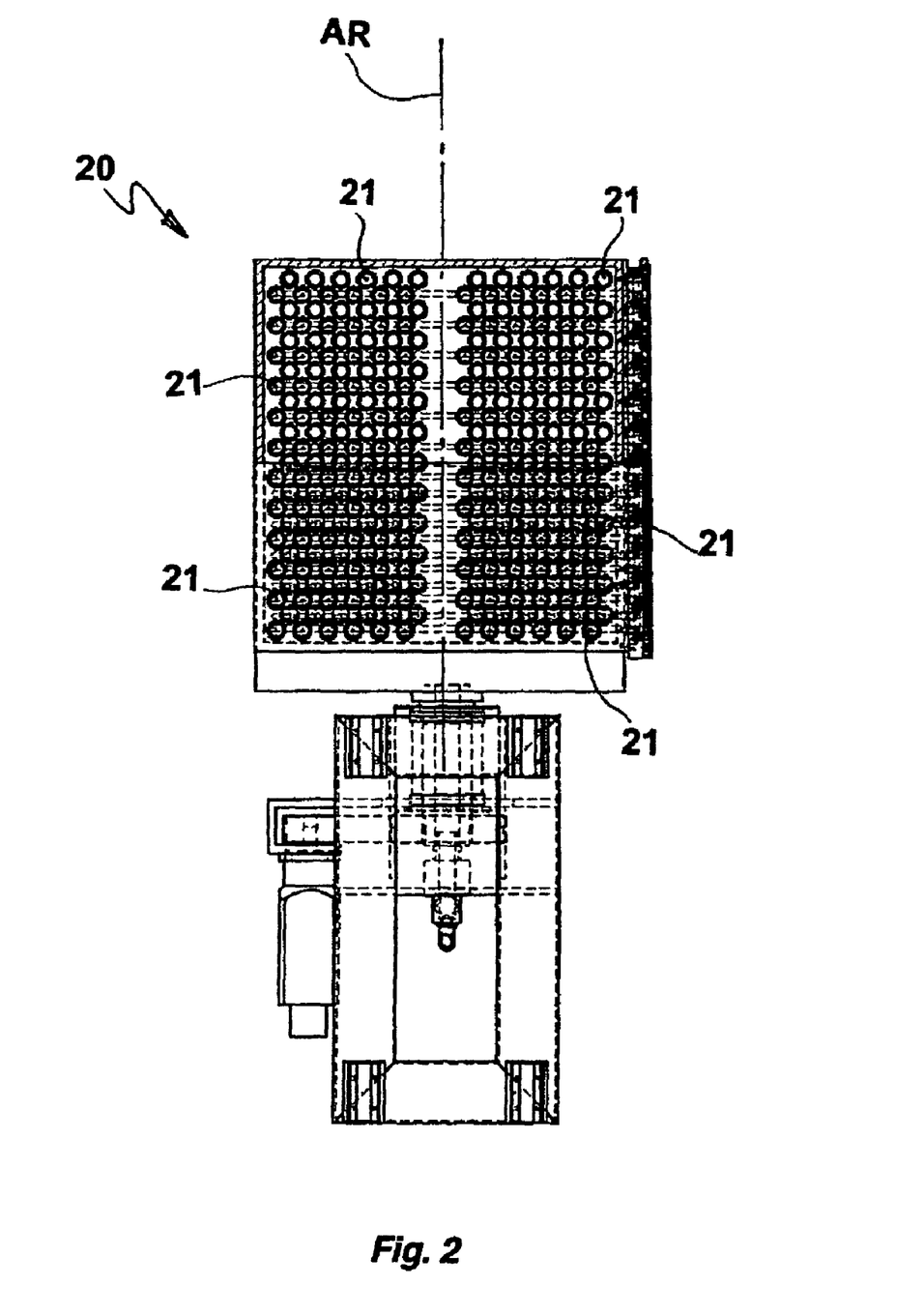
FIG. 2 shows in outline a top view of a device for extraction and cooling for preforms of plastic material, according to a preferred embodiment of the present invention.

FIG. 2 relates to a conditioning device for plastic objects which are essentially oblongs in a plastic material, in particular preforms in PET with which, following a further blowing moulding operation, bottles, jars, flagons or other types of containers are produced, according to a preferred embodiment of the present invention. This conditioning device, also described as a rotating turret and indicated by the general reference 20, comprises a group of housing bodies 21, more or less tubular in shape or even hollow and defined also, in the current description, as "cooling cups".

Figure 3:
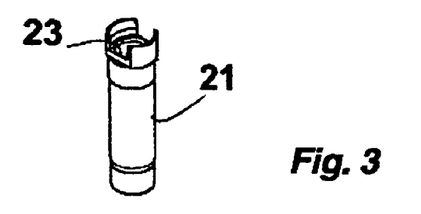
FIG. 3 shows in outline a view in perspective of a detail of the device in FIG. 2.
Figure 4:
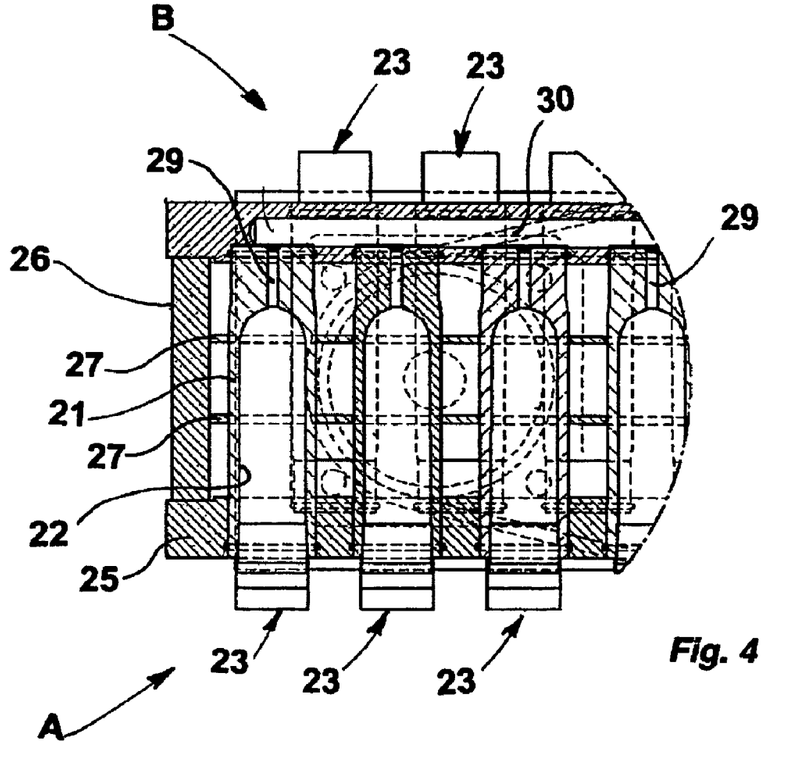
FIG. 4 shows in outline a detail of a lateral view in section of the rotating conditioning device in FIG. 2.

The cooling cups 21 are fixed on a suitable frame or support casing, aligned in two spatial directions, horizontal and vertical, with reference to FIG. 2, and arranged in lines and columns in order to form a square mesh grid. Inside each tubular chamber (FIG. 3) is a seat 22 for the housing of the preforms, into which a single preform to be cooled can be inserted through the insertion opening 23 (FIG. 4). For clarity an example of what is meant by "preform" is described in Italian Patent IT B 1289367.

In the example of embodiment in FIGS. 2 and 4 the various cooling cups 21 are located side by side as are the preforms which are inserted therein, and the group of cups 21 constitutes a body approximately in the form of a parallelipiped which creates a series of sides facing each other in pairs. In particular, relating to the embodiment of FIGS. 2 and 4, in correspondence with the larger sides A and B of the parallelipiped, the insertion openings 23 of two groups of cooling cups 21 are located with a facing orientation, that is, the insertion openings 23 of a first group of cups 21 face the first side A of the rotating turret (see FIG. 4) and are turned towards the bottom while the insertion openings 23 of a second group of cups 21 face the second side B of the rotating turret (see FIG. 4 and are turned towards the top).

Figure 4A:
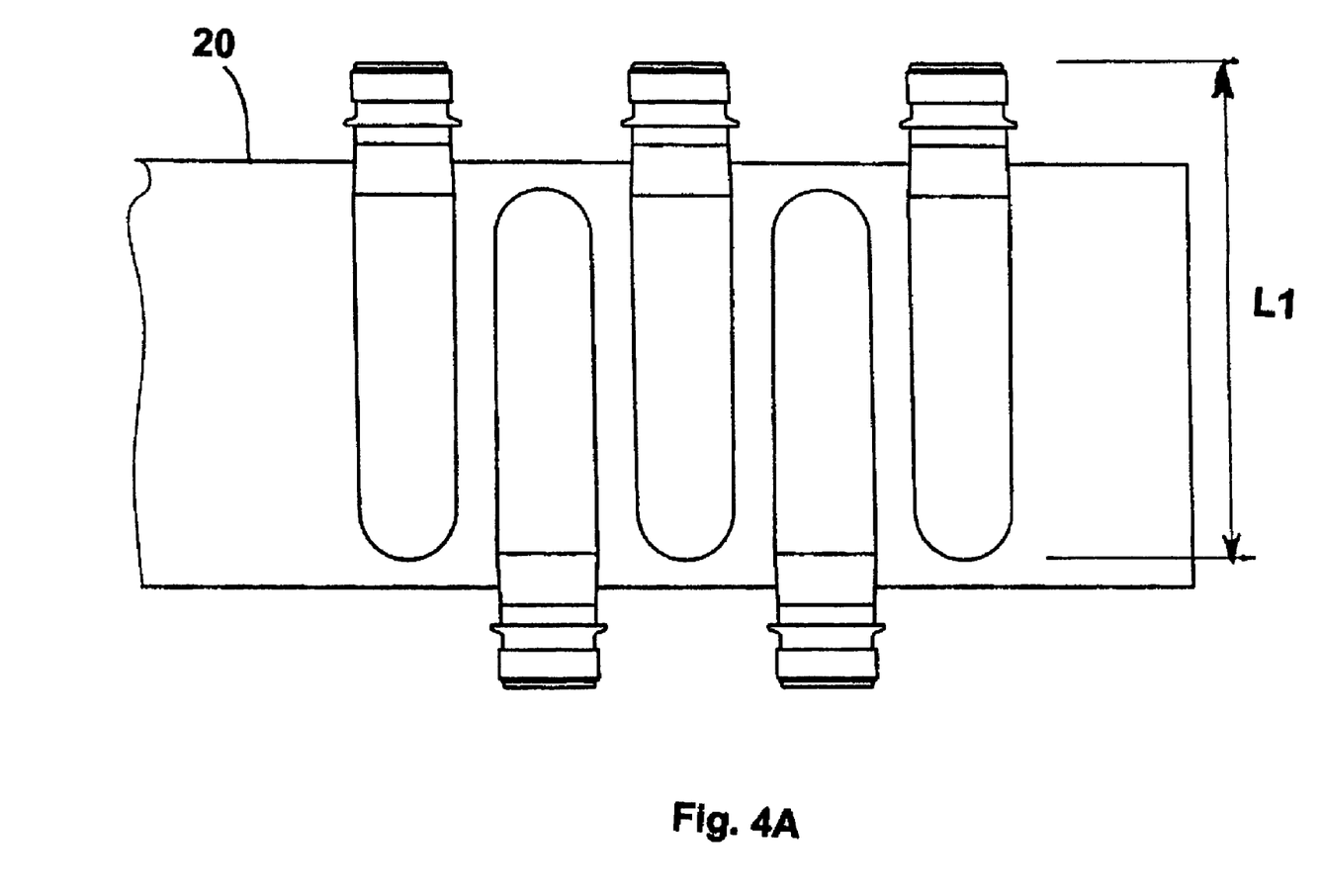
FIG. 4A shows an outline disposition of the preforms in the rotating conditioning device in FIG. 2.

In accordance with a first aspect of the present invention the cooling seats 22 are located in such a way that, inserting two or more preforms for cooling in these cooling seats 22, the one through the insertion opening 23 situated on the first side A, and the other preform through the insertion opening 23 situated on the second side B, these two preforms, once inserted in their respective cooling seats, lie side by side for at least part of their length (FIGS. 4, 4A). In this way, compared for example with the location of cooling cups in existing devices, it is possible to use rotating stands of a reduced thickness so that they can be inserted directly in the middle of the two open halves of a mould mounted on a press for the moulding of preforms, rather than having to use an intermediate sliding stand sufficiently thin so as to be able to be inserted between the two open halves of moulds. Thus the cooling cycle time can be reduced as the transferring operation from an intermediate stand to the cooling turret is avoided and the preforms are prevented from having to remain for a certain time on a non cooled intermediate stand.

Moreover in this way it is possible to produce cooling stations for plastic objects with a mechanical structure, and appropriate electric/electronic or pneumatic circuitry—simpler in comparison with the cooling stations of known type.

Preferably, but not necessarily, the cooling seats 22 are located in such a way that, inserting two or more preforms to be cooled each in one of the cooling seats 22, the one through an insertion opening 23 situated on the first side A, and the other preform through an insertion opening 23 situated on the second side B, the two preforms, once inserted in their respective cooling seats, lie side by side for at least a substantial part of their length (FIGS. 4, 4A).

Advantageously, to reduce the width and length dimensions of the rotating turret 20, the cooling seats 22 are machined between housing bodies 21 of relatively simple geometry, for example free of shells, hollows or internal cooling channels, and all the housing bodies 21 are enclosed in a containment sheath formed, in the present embodiment example (FIG. 4), of two frontal metal plates 24, 25 and of two lateral plates 26, welded or screwed together so as to form a caisson; from such a caisson the extremities of the cups 21, whereon are machined the insertion openings 23, protrude.

The internal space in the caisson, between the external walls 24, 25, 26 and the cooling cups, can be refilled or anyway passed by a cooling liquid designed to cool the preforms inserted in the various cooling seats 22. A group of internal partition walls 27, appropriately pierced or drained, enable the cooling liquid to carry out an appropriate flow inside the caisson in order to wet and cool the various tubular vessels in the desired manner.

Figure 10:
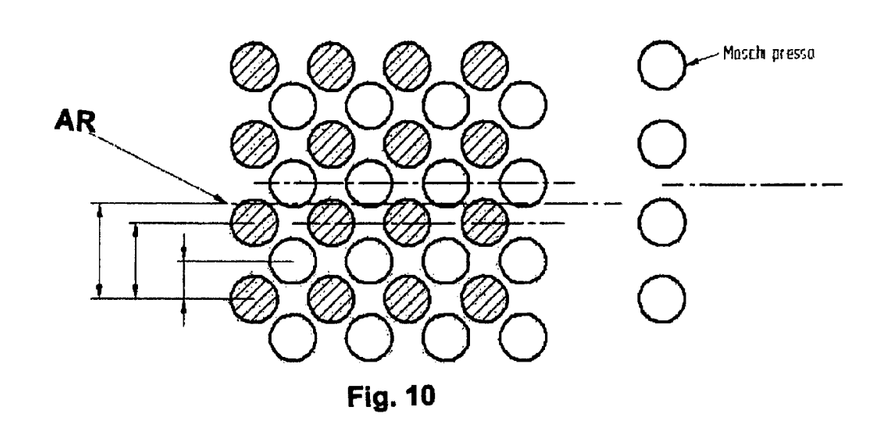
FIG. 10 shows an alternative layout of the perform arrangement.

As will be clearer later from the description of the rotating support operation from the attached Figures, in order to manage the transfer of the preforms from the injection mould to seats 22, simply by gravity, with the cooling seats 22 arranged as in FIG. 2 it is necessary that, at every tilting of the rotating support 20, the rows of seats 22 parallel to the tilting axis be at the vertical of the corresponding rows of preforms still attached to the mould. If particular geometric positions of the rows of the cooling seats are adopted on the two sides of the rotating support, for example when they are arranged lozenge-like, it can result in rotating the rotating support around the axis AR, that the positions of the housing seats do not match the positions of the housing seats on the opposite side. This lozenge type of arrangement of the seats is outlined in FIG. 10. In such a case means are provided to move the rotating turret on each of its rotations, to the necessary distance as to locate each side with the openings of the respective cups in the proper position. In this way, at every tilt of the rotating support, the columns of cups are automatically positioned at the vertical of a corresponding column of moulds of the injection mould or of the device which withdraws the cooled preforms from the cooling station 100.

The rotating turret 20 is also provided with useful retaining means of controlling the preforms, designed to block them and retain them in their cooling seats 22 when the seats themselves are turned downwards&

In the embodiment example in FIG. 4 such a retaining system of preforms is achieved with a system of channels 29, 30 connected to a pneumatic circuit: to maintain a preform in a cooling seat 22 a pneumatic depression in channels 29, 30, is generated, whilst to control or perhaps to facilitate the expulsion of the preform the rotating support 20 can be provided with different types of extraction systems, for example mechanical blocking systems. Without departing from the scope of the present invention, it is possible to combine mechanical extraction means with pneumatic means which are operated in reverse, blowing compressed air into channels 29, 30 if deemed necessary.

Figure 6:
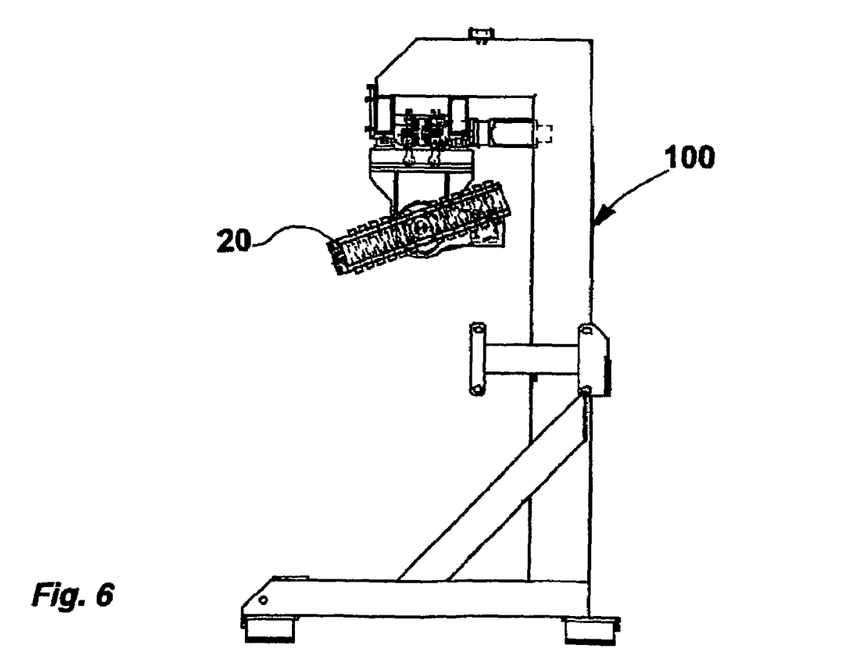
FIG. 6 shows in outline, in a frontal view, the rotating conditioning device of FIG. 5 during the tilting phase.

Now follows a description of a first preferred example of the rotating turret 20 operation described above, together with further construction and functional characteristics of a cooling station, or more generally of a conditioning station, indicated by the comprehensive reference 100 (FIG. 6) whereon the turret is mounted.

Figure 7:
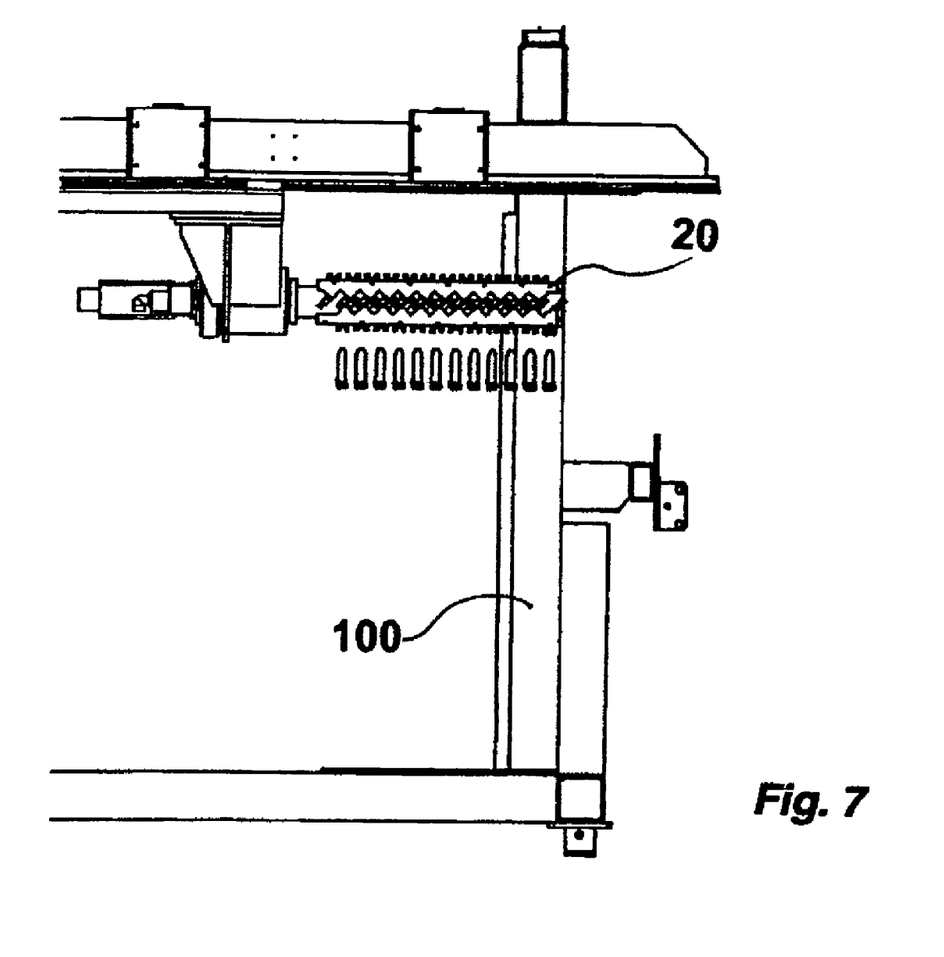
FIG. 7 shows in outline, in a frontal view, the rotating conditioning device of FIG. 5 during the unloading phase of the preforms.

The rotating turret in FIG. 2 is mounted on an appropriate metal frame (FIG. 5-7) enabling it to run horizontally and to rotate approximately by 180°—around a rotational axis AR, which is also horizontal so as to tilt and to turn the first or the second side A, B each time towards the top or towards the bottom (or, in other types of embodiment, towards another predetermined direction).

Figure 5:
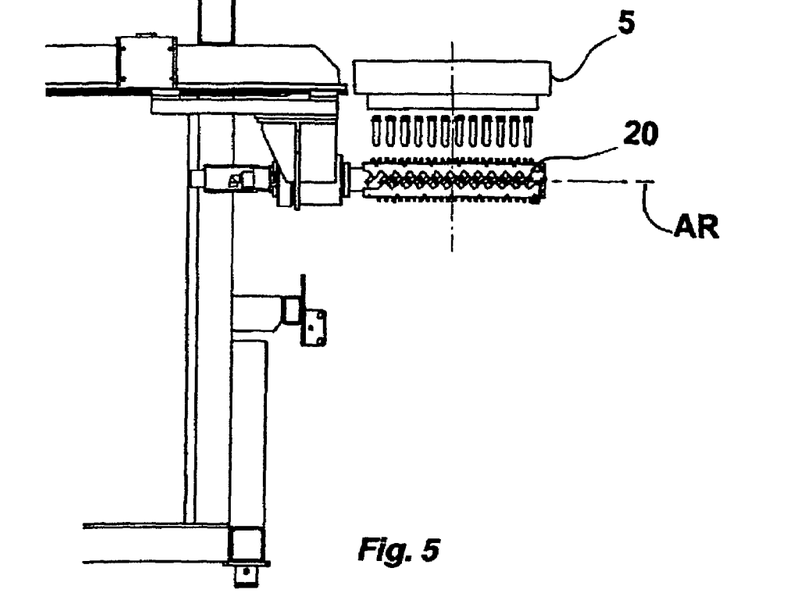
FIG. 5 shows in outline, in a lateral view, the rotating conditioning device in FIG. 2, inserted between the two open halves of a mould for the injection moulding of preforms, during the loading phase of the preforms.

FIG. 5 relates to a first instant of the operation sequence of the cooling station 100, where the rotating turret 20 is in a first loading position, and where, it is inserted between the opened halves of a mould, mounted on an injection moulding press, so as to be situated under the higher half mould S: there are a number of N preforms resulting from one moulding process which are dropped from half mould S into N cooling seats 22 of the support 20—clearly both the support 20 and the mould are designed in such a way that on the vertical of a moulding shell of the mould there is a seat 22 of the support which is properly positioned in the middle of the mould.

According to the present preferred embodiment, the group of N preforms is dropped into the seats 22 of the rotating turret 20 refilling only some lines (where by a line one means a row of seats 22 perpendicular to the rotation axis AR) of seats 22, for example only the odd lines 1, 3, 5, 7 . . . or only the even lines 2, 4, 6, 8 and leaving interposed with the refilled lines empty lines—respectively the even lines 2, 4, 6, 8 . . . or the odd lines 1, 3, 5, 7 . . . so as to form a regular succession of full and empty lines of seats 22. It is possible to effect other refill sequences without departing from the scope of this invention.

Subsequently the turret is extracted from mould S—translating towards the left with reference to FIG. 5—in order to close the mould itself and to effect another moulding process of N preforms; then the turret 20 is again inserted into the middle of the two open half moulds under the half mould S, and the second group of freshly moulded N preforms is dropped onto the support 20 so as to refill the lines of seats 22 which had remained empty (respectively even lines 2, 4, 6, 8 . . . or the odd lines 1, 3, 5, 7 . . . ).

In alternative embodiments it is possible to provide a movement orthogonal to the rotational axis AR of the turret 20.

When the second group of N preforms has been transferred onto the turret 20, all the cooling seats 22 of one of the two sides of the rotating turret 20—for example side A—are occupied by preforms; the rotating turret 20 is again extracted from the open halves of the mould S and, while it is proceeding to a new moulding process, it is tilted (FIG. 6) rotating it by approximately 180 degrees around the AR axis.

The second side B is now turned upwards and is refilled by a series of operations identical to that described above, with other two groups of N preforms each. When all the cooling seats 22 of side B have also been refilled with preforms the rotating turret 20 is extracted from the open half moulds and is carried into an unloading position (FIG. 7) wherein the first group of N preforms—loaded firstly and now which has a lower temperature—is released from the rotating turret 22 by simply letting it fall, with the help of the mechanical extraction means from channels 29, 30 of the preform retaining system described above—onto another evacuation support, for example a conveyor belt or a collecting box for cooled preforms. The extraction means are well known and are not described in detail here. With this refilling method it is possible to maintain a group of N preforms, resulting from a press operation, on the cooling station 100 for an amount of time equivalent to four moulding cycles.

Figure 8:
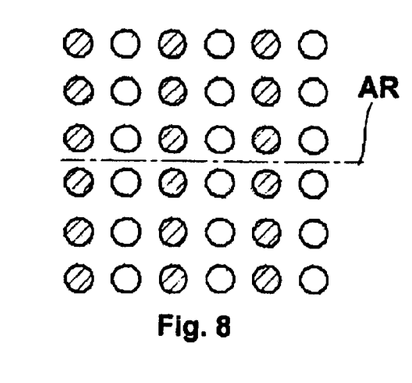
FIG. 8 shows the lay out of the preform arrangement in the conditioning device during a moulding process with four pressings for each conditioning cycle.

The cooling station 100 can then repeat the above mentioned operating cycle, unloading a group of cooled N preforms for a period of time equal to four moulding cycles each time that the rotating turret 20 is extracted from the open mould, and loading onto the turret 20 a new group of N preforms to be cooled and dropped from the injection mould (FIG. 8).

Likewise, with a second preferred embodiment example of the rotating turret 20 operation and of the cooling station 100 according to another aspect of the present invention, described here below, it is possible to maintain a group of N preforms, resulting from a press operation, to stay on the cooling station 100 for an amount of time equivalent to six moulding cycles.

Figure 9:
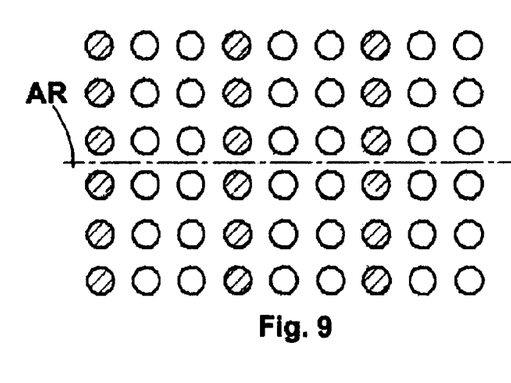
FIG. 9 shows the lay out of the preform arrangement in the conditioning device during a moulding process with six pressings for each conditioning cycle.

In this second mode of operation the rotating support 20 is inserted between the open halves of a mould, in a first loading position mounted on the injection moulding press, and a first group of N preforms, resulting from a press operation, is dropped from the half mould into N cooling seats 22 of turret 20 so as to refill a first line of seats 22 (for example line number 1), leaving empty the two successive lines of seats 22 (lines number 2, 3), then refilling a second line (i.e. line number 4), leaving empty the two successive adjacent lines (i.e. lines number 5, 6) and so on, so as to form a regular succession of lines of seats 22 both full and empty (FIG. 9).

Similarly to a refilling sequence equivalent to four moulding cycles there are loaded onto the rotating support another five groups of N preforms, each resulting from one press operation, so as to maintain on the rotating turret 20 a total of 6 groups of N preforms to be cooled, and unloading a group of N preforms cooled for a period of time equivalent to six moulding cycles every time that the rotating support 20 is extracted from the open mould.

With a further preferred operation example of the rotating turret 20 and of the cooling station 100 according to another aspect of the present invention, described below, it is possible for a group of N preforms resulting from one press operation to stay on the cooling station 100 for a period of time equivalent to two moulding cycles.

In this mode of operation the rotating turret 20 is inserted between the two open halves of a mould, in a first loading position mounted on the injection moulding press, and a first group of N preforms, resulting from a press operation, is dropped from the half mould into N cooling seats of the turret 20 so as to refill all the cooling seats 22 of a side of the turret 20 itself—for example side A; the turret is then rotated by 180° around rotation axis AR and, by reintroducing support 20 in the middle of the open half moulds, dropping from the top half mould S a second group of N preforms all the cooling seats 22 of the second side B of the turret 22 are refilled.

The embodiment examples of the rotating turret 20, of the cooling station and of the relative operational sequences described above are suscepible of numerous modifications and variations without departing from the scope of the present invention.

For example the turret can be made not only as a pair of metallic plates welded or screwed together to form a caisson, but more generally as a casing defining one or more internal cavities wherein the essentially tubular bodies 22 are located and designed to hold a cooling fluid; the cooling cups can also feature internal cooling channels; the cooling seats 22 can also be located on the two sides A, B of the rotating turret not only aligned in two directions in a plane between their perpendicular but also in two directions which are simply not parallel, or even in a more irregular way; or not only according to a grid with square mesh, but also with other dispositions as for example grids of rectangular or rhomboid mesh.

Every modification and variation which falls within the meaning and the field of the equivalences of the claims has to be understood as included in them.

The invention claimed is:

1. A device for conditioning of objects in plastic material, having a length, comprising:
   a rotating turret comprising two opposing sides that include a first side and a second side, wherein the first side and the second side of the rotating turret face in opposite directions; and
   a group of conditioning cavities, each conditioning cavity having a length and being provided with a respective opening for the insertion of said objects, said group of conditioning cavities comprising first and second conditioning cavities,
   wherein the openings of the first conditioning cavities are located on the first side of the rotating turret, and
   the openings of the second conditioning cavities are located on the second side of the turret, such that the openings of the first conditioning cavities and the openings of the second conditioning cavities face in opposite directions,
   the first conditioning cavities being located in such a way as to be side by side with the second conditioning cavities for at least part of their own length.

2. A device as claimed in claim 1, wherein the turret comprises a box-like structure including an external casing and each conditioning cavity is enclosed in a respective individual casing contained in turn inside the box-like structure.

3. A device as claimed in claim 2, wherein the individual casings are designed to contain a conditioning fluid for the conditioning cavities.

4. A device as claimed in claim 2, wherein the box-like structure contains at least a conditioning fluid circulation circuit acting operationally on the conditioning cavities.

5. A device as claimed in claim 4, wherein the first conditioning cavities are adjacent on both sides, following the directions of lines and columns, with one of second cavities.

6. A device as claimed in claim 3 or 5, comprising means for rotating the turret at least around the rotational axis so as to turn each time said first or said second side toward a predetermined reference direction.

7. A device as claimed in claim 6 wherein the means for rotating are intended to translate the turret in order to vary the alignment of the conditioning cavities.

8. Moulding equipment for plastic objects, including a conditioning device according to claim 1.

9. Moulding equipment according to claim 8, further comprising means for tilting said turret so as to turn each time said first side or said second side upwards or downwards.

10. A method of conditioning a plurality of moulded objects in plastic material, comprising:
   arranging a first side of a conditioning device according to claim 1 turned upwards;
   introducing the rotating turret in the middle of the two open halves of a warm forming mould;
   transferring at least one group of moulded objects, resulting from a press operation, from said mould in which they have been formed, to said rotating turret so as to refill at least a part of said conditioning cavities of said first side;
   extracting the rotating turret from the two said open halves of the mould
   tilting the rotating turret so that said second side is turned upwards.

11. A method as claimed in claim 10, comprising:
   reintroducing at least a second time the rotating turret into the middle of the two open halves of said mould;
   transferring at least a second group of moulded objects, resulting from a successive pressing cycle, from the mould in which they have been formed, to said rotating turret so as to refill at least a part of the conditioning cavities of said second side of the turret.

* * * * *